United States Patent
Matsumoto et al.

(10) Patent No.: US 6,328,924 B1
(45) Date of Patent: Dec. 11, 2001

(54) INSTRUMENT PANEL

(75) Inventors: Masahito Matsumoto, Ibaraki; Nobuhiro Usui, Takatsuki, both of (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 940 days.

(21) Appl. No.: 08/654,752

(22) Filed: May 28, 1996

Related U.S. Application Data

(63) Continuation of application No. 08/211,813, filed on Apr. 19, 1994, now abandoned, which is a continuation of application No. PCT/JP93/01204, filed on Aug. 26, 1993.

(30) Foreign Application Priority Data

Aug. 26, 1992 (JP) .................................................... 4-227065

(51) Int. Cl.$^7$ .............................. B29C 43/18; B29C 45/14
(52) U.S. Cl. ....................... 264/511; 264/294; 264/328.7
(58) Field of Search .................................. 264/511, 154, 264/155, 328.7, 294, 296

(56) References Cited

U.S. PATENT DOCUMENTS

| | | | | |
|---|---|---|---|---|
| 1,935,943 | * | 11/1933 | Conner | 264/155 |
| 4,385,025 | * | 5/1983 | Salerno et al. | 264/328.7 |
| 4,560,186 | | 12/1985 | Onitsuka et al. | 280/752 |
| 4,707,321 | * | 11/1987 | Segawa et al. | 264/328.7 |
| 4,717,195 | * | 1/1988 | Okuyama et al. | 296/72 |
| 4,923,539 | * | 5/1990 | Spengler et al. | 264/511 |
| 5,091,031 | * | 2/1992 | Strapazzini | 264/511 |
| 5,122,320 | * | 6/1992 | Masui et al. | 264/155 |
| 5,130,075 | * | 7/1992 | Hara et al. | 264/328.7 |
| 5,141,690 | * | 8/1992 | Marshall | 264/154 |
| 5,196,151 | * | 3/1993 | Sakaida et al. | 264/511 |
| 5,304,579 | * | 4/1994 | Hara et al. | 264/328.7 |

FOREIGN PATENT DOCUMENTS

| | | | |
|---|---|---|---|
| 0175121 | 3/1986 | (EP) . | |
| 2059330 | 4/1981 | (GB) . | |
| 61241126 | 10/1986 | (JP) . | |
| 61-287832 | * 12/1986 | (JP) | 296/70 |
| 3078716 | * 4/1988 | (JP) | 264/511 |
| 63 32735 | 9/1988 | (JP) . | |
| 3 36696 | 6/1991 | (JP) . | |
| 4074613 | * 3/1992 | (JP) | 264/511 |

OTHER PUBLICATIONS

Ku (editor), 'Mold for Injection Molding', 1988, pp. 342–343, (Chien Fon, ROC publisher).

* cited by examiner

Primary Examiner—Jan H. Silbaugh
(74) Attorney, Agent, or Firm—Fitch, Even, Tabin & Flannery

(57) ABSTRACT

An instrument panel is provided having a skin material integrally bonded to the surface of a thermoplastic resin core material. The panel is obtained by feeding the skin material to a cavity between a pair of male and female molds having been designed so as to give a desired instrument panel shape, and press-molding a molten thermoplastic resin after or while feeding the molten thermoplastic resin to the cavity between the skin material and the male mold or the female mold. Brackets are formed integrally, by press-molding, with the core material resin on opposing end portions and at a back portion of the instrument panel.

6 Claims, 2 Drawing Sheets

INSTRUMENT PANEL

This is a continuation of application Ser. No. 08/211,813, filed on Apr. 19, 1994, now abandoned which is a 371 of PCT/JP93/01204 filed Aug. 26, 1993.

TECHNICAL FIELD

This invention relates to a skin material-laminated instrument panel, on the peripheral portion and/or back of which a bracket is formed integrally with a core material resin.

BACKGROUND OF THE INVENTION

As the instrument panel, there have heretofore been well known an instrument panel in which a skin material is laminated with an adhesive to the surface of a thermoplastic resin core material previously formed into the desired shape by injection molding or the like and an instrument panel in which a skin material is integrally lamination-molded on the surface of a thermoplastic resin core material by a press-molding method as shown in Japanese Patent Application Kokai No. HEI.-1-235,613.

Usually, such instrument panels require a bracket for attaching the panel to the body of an automobile or fitting a further separate part to the instrument panel, and as such conventional instrument panels having attached thereto a bracket, there have been known skin material-laminated instrument panels as mentioned above having a bracket produced separately as a separate part fixed on their peripheral portion or back with bolts or screws or bonded thereto with an adhesive or the like.

However, in the case of such instrument panels having attached thereto a bracket, there have been not only such troubles concerning production steps that a bracket is separately produced and attached to the core material of the instrument panel with screws or bolts or with an adhesive or the like, but also such problems in the bracket-attached portion that the core material of the instrument panel and the bracket-attaching material overlap each other to make the layer thick, the cost is increased and the weight is increased. Moreover, in the attached portion, there have been such problems that the bracket is disconnected owing to loosening of screws and bolts, insufficient adhesion or the like.

SUMMARY OF THE INVENTION

Under such circumstances, the present inventors have made investigation to solve the problems of the conventional instrument panels and have consequently invented a skin material-laminated instrument panel in which a bracket is formed integrally with the core material.

That is to say, the present invention provides an instrument panel in which a skin material is integrally laminated to the surface of a thermoplastic resin core material, and which is obtained by feeding a skin material to the cavity between a pair of male and female molds having been designed so as to give a desired instrument panel shape, and then press-molding a molten thermoplastic resin after or while the molten thermoplastic resin is fed to the cavity between the skin material and the male mold or the female mold, characterized in that a bracket is formed integrally with the core material resin on the peripheral portion and/or back of the instrument panel.

Figure 1:
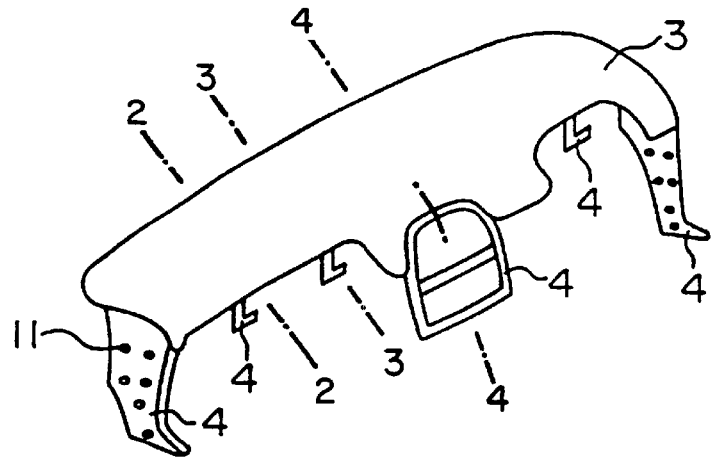
FIG. 1 is a perspective view of the instrument panel of this invention.

Incidentally, the reference numerals in the figures have the following meanings:

1: Skin material,
2: Thermoplastic resin core material,
3: Instrument panel,
4: Bracket,
5: Female mold,
6: Male mold,
7: Resin-feeding path,
8: Molten thermoplastic resin,
9: Protrusion,
10: Protrusion-receiving concave,
11: Bolt hole for attaching,
12: Bolt,
13: Vacuum suction path

BEST MODE FOR PRACTICING THE INVENTION

This invention relates to an instrument panel in which a skin material is integrally laminated to the surface of a thermoplastic resin core material obtained by feeding the skin material to the cavity between a pair of male and female molds having been designed so as to give a desired instrument panel shape, and subsequently press-molding a molten thermoplastic resin after or while feeding the molten thermoplastic resin to the cavity between the skin material and the male mold or the female mold, characterized in that a bracket is formed integrally with the core material resin on the peripheral portion and/or back of the instrument panel.

In this invention, the thermoplastic resin used as the core material for the instrument panel is not particularly limited, and there can be mentioned, for example, polyolefin resins such as polypropylene, polyethylene and the like; styrene resins such as polystyrene, acrylonitrile-styrene-butadiene copolymer, acrylonitrile-styrene copolymer and the like; polyamide resins such as nylon and the like; etc.

Such thermoplastic resins may be used alone or in admixture of two or more. Moreover, if necessary, fillers such as inorganic fillers, glass fibers and the like and various additives such as pigments, lubricants, antistatic agents and the like may be compounded therewith.

As the skin material, there are mentioned woven fabrics, knitted fabrics, non-woven fabrics and the like; and sheets or films composed of a thermoplastic resin or a thermoplastic elastomer, and those having a concavo-convex pattern such as emboss or the like can also be used. Also, foams made of a thermoplastic resin such as polyolefin, polyvinyl chloride, polystyrene or the like; foams made of a thermosetting resin such as polyurethane or the like; or foams made of a rubber such as cis-1,4-polybutadiene, ethylene-propylene copolymer or the like can be used. These skin materials may be used alone or in the form of a laminate of two or more skin materials, for example, such a laminate that a thermoplastic elastomer sheet is backed with a polyolefin resin foam through an adhesive or by heat welding. In the use of these skin materials, it is preferable to partially or wholly preform them into an instrument panel shape.

The instrument panel of this invention is an instrument panel in which a skin material is integrally laminated to the surface of a thermoplastic resin core material, characterized in that a bracket is formed integrally with the core material resin on the peripheral portion and/or back of the instrument panel.

Here, the bracket is an attaching part provided on the peripheral portion and/or back of the instrument panel for attaching the instrument panel to the body of an automobile or attaching a further separate part to the instrument panel, and may have screw holes and bolt holes, the number, arrangement, shape and structure of which may be varied depending upon the purpose of use. The bracket may have screw holes and bolt holes.

Incidentally, the bracket referred to in this invention includes not only those to be directly used for attaching, but also those having a guide-like function for alignment necessary for attaching.

The instrument panel of this invention is explained below based on the drawings.

Figure 2:
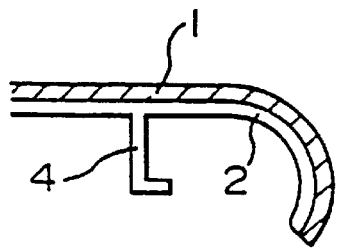
FIGS. 2–4 are partial sectional views of the instrument panel shown in FIG. 1, and taken along the lines 2—2, 3—3, and 4—4, respectively, in FIG. 1.
Figure 3:
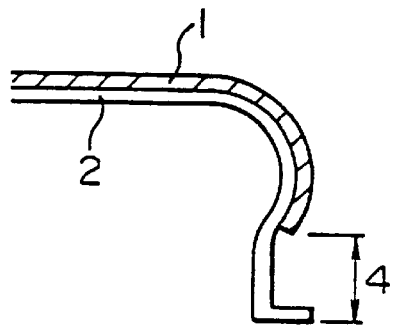
Figure 4:
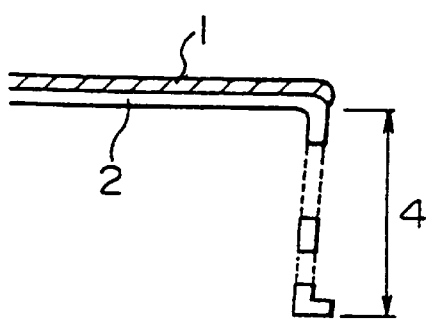

In FIG. 1, an example of the instrument panel of this invention is shown as a perspective view, and FIGS. 2–4 are partially enlarged views of the cross-sections of the peripheral portion of the instrument panel at lines 2—2, 3—3 and 4—4, respectively in FIG. 1.

Incidentally, though not shown in the figures, on the back of the 2—2 portion of the instrument panel of FIG. 1, a bracket is provided integrally with the core material resin, and FIG. 2 shows the cross-section at the portion having such a bracket 4.

Figure 5:
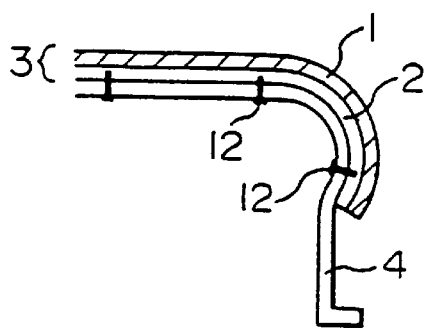
FIG. 5 is a partial sectional view of a conventional instrument panel having attached thereto a bracket.

FIG. 5 is a partial cross-sectional view of a conventional instrument panel having attached thereto a bracket as a separate part, and the bracket 4 is fixed to the core material 2 of the instrument panel by means of screws 12. The bracket-fixed portion has a three-layer structure.

As shown in these figures, in the instrument panel 3 of this invention, the desired number of brackets 4 having the shape necessary for the purpose of use are formed integrally with the core material resin of the instrument panel on the peripheral end portions and back of the instrument panel 3 and extending generally transverse with respect to a top panel surface 14.

This bracket is mainly applied for attaching an instrument panel to the body of an automobile and attaching a further separate part to an instrument panel, so that the dimensional precision at the time of attaching and the dimensional stability after attaching are required. However, when a skin material, particularly a skin material backed with a foam layer exists on the surface of the bracket, problems are often caused in dimensional precision and dimension stability by this skin material, and hence, it is preferable that no skin material is present on the surface of the bracket and the core material resin is exposed as it is.

The instrument panel of this invention is produced by feeding a skin material to the cavity between a pair of male and female molds so designed that the desired instrument panel shape is obtained and subsequently press-molding a molten thermoplastic resin after or while feeding the molten thermoplastic resin to the cavity between the skin material and the male mold or the female mold.

A specific example of producing the instrument panel of this invention is explained based on FIGS. 6–8 hereinafter.

Figure 6:
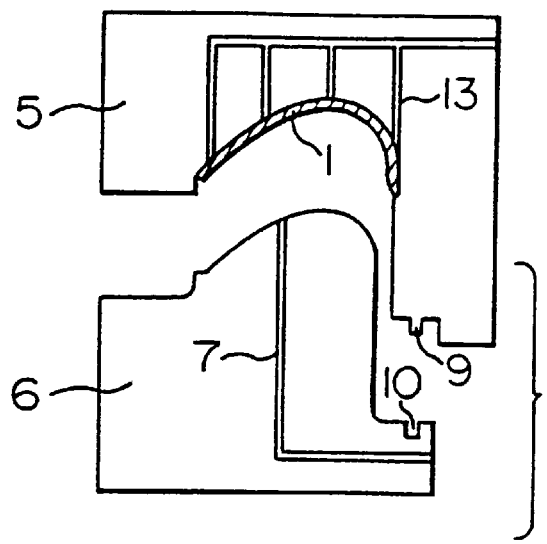
FIGS. 6–8 show an outline of the process for producing the instrument panel of this invention.
Figure 7:
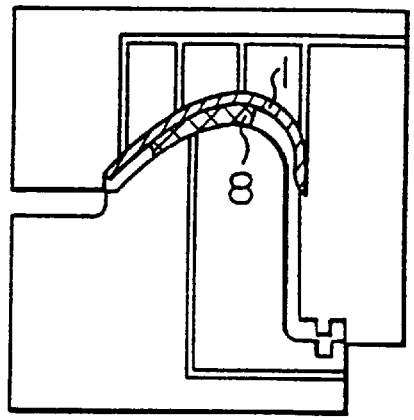
Figure 8:
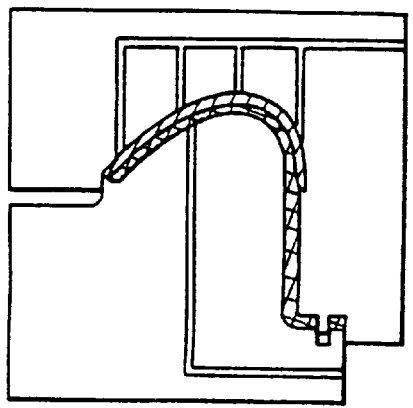

Incidentally, FIGS. 6–8 show diagrammatically the cross-section of the mold at the 3—3 portion in the production of the instrument panel shown in FIG. 1.

In the open state of a pair of male and female molds 6 and 5, respectively, are so designed that the desired instrument panel shape having a bracket is obtained, the skin material 1 which has preferably been preformed into the desired shape is kept along the desired position of the mold surface of the female mold 5 by vacuum suction from the vacuum suction path 13 (FIG. 6) or other means, and the female mold 5 is taken down to an appropriate place, after which a molten thermoplastic resin 8 is fed to the cavity between the skin material 1 and the male mold 6 from the resin-feeding path 7 provided in the male mold 6 (FIG. 7). After the desired amount of the molten resin 8 has been fed, the female mold 5 is further taken down and clamping is effected or alternatively the female mold 5 is taken down while the molten resin 8 is fed and the clamping is effected in parallel to the feeding of the molten resin 8, until the desired cavity clearance is reached to form the molten resin 8 into the desired shape, simultaneously with which the skin material 1 is laminated to the surface of the thermoplastic resin core material 2 (FIG. 8).

After cooling, the mold is opened and a molded article is taken out.

Incidentally, in order to form, at the end of the bracket, a perforation 11 through which a bolt or the like for attaching the instrument panel to the automobile body or attaching other parts to the instrument panel is passed, a protrusion 9 having a size corresponding to the perforation is formed in the female mold 5 and a corresponding concave 10 for receiving the protrusion 9 is formed in the male mold 6. The side walls of the protrusion 9 and the concave 10 have a shear structure with each other.

By such a method, there can be produced an instrument panel in which the skin material is integrally laminated to the surface of the thermoplastic resin core material, and simultaneously therewith, at least one bracket is formed integrally with the core material resin on the peripheral portion and/or back of the instrument panel.

Incidentally, the above-mentioned apparatus and the production process using the same are an example of one working mode, and it is needless to say that the process for producing the instrument panel of this invention is not limited thereto.

The instrument panel of this invention does not have any troubles for producing a bracket separately and attaching the same because the skin material is strongly and integrally laminated to the surface of the thermo-plastic resin core material simultaneously with the molding of an instrument panel and a bracket is simultaneously formed integrally with the core material of the instrument panel. In addition, there is no problem that the instrument panel layer at the bracket-attached portion becomes partially thick. Therefore, no unnecessary increase of the weight is caused. Furthermore, such an effect is obtained that there is no problem that the loosening of screws and bolts and insufficient adhesion in the bracket-attached portion cause the bracket to be disconnected.

WORKING EXAMPLES

This invention is explained below in more detail by Examples; however, this invention is not limited thereby.

Example 1

Based on the process shown in FIGS. 6–8, an example of producing an instrument panel having a total length of 1,400 mm as shown in FIG. 1 is explained below.

As a skin material, an embossed polypropylene elastomer sheet having a thickness of 0.8 mm, to the back of which a 3-mm thick, foamed polypropylene sheet having a foaming ratio of 15 (PPSM 15030 manufactured by TORAY INDUSTRIES, INC.) was laminated by heat welding, was used. First of all, the skin material was preformed in a separate step and thereafter kept in the desired position on the mold surface of a female mold by vacuum suction.

As a thermoplastic resin, polypropylene (Sumitomo Noblen BP697K manufactured by Sumitomo Chemical Co., Ltd.; melt flow index: 30 g/min) was used, and this was melted at 230° C. and fed into a mold cavity through a resin-feeding path provided in the male mold, after which clamping was conducted. At this time, the temperatures of the female mold and the male mold were 30° C. and 40° C., respectively.

Incidentally, the feeding of the molten resin was started when the cavity clearance in the direction of the clamping of the male and female molds was 60 mm, and completed when the cavity clearance was 30 mm. After completion of the feeding of the molten resin, the clamping was conducted until the desired thickness was reached.

The speed of the clamping of the female mold was set at a constant speed of 7 mm/sec between the starting of the feeding of the molten resin and the completion of the cleaning. Also, the force required for the clamping was 180 tons. For 35 seconds after the completion of the clamping, cooling under pressure was conducted and then a molded article was taken out of the mold.

In the instrument panel molded article having a thickness of 5 mm obtained, the thermoplastic resin core material and the skin material were strongly laminated to each other and a bracket was formed integrally with the thermoplastic resin core material.

Example 2

An instrument panel was produced under the same conditions as in Example 1, except that as the skin material, an embossed PVC sheeting having a thickness of 0.8 mm, to the back of which a 3-mm thick foamed polypropylene sheet having a foaming ratio of 15 (PPSM15030 manufactured by TORAY INDUSTRIES, INC.) was laminated with an adhesive, was used.

In the instrument panel molded article obtained, the thermoplastic resin core material and the skin material were strongly laminated to each other and a bracket was formed integrally with the thermoplastic resin core material.

UTILIZATION FIELD IN INDUSTRY

The instrument panel of this invention does not have troubles of separately producing a bracket and attaching the same to the panel because simultaneously with molding the instrument panel the skin material is strongly laminated integrally to the surface of the thermoplastic resin core material and the bracket is formed integrally with the core material of the instrument panel, nor has such a problem that in the bracket-attached portion, the instrument panel layer becomes partially thick. Therefore, a bracket can be provided which has such advantages that making the weight light is possible and moreover no problem is caused that the bracket is disconnected owing to the screws and bolts being loosened, insufficient adhesion or the like in the bracket-attached portion.

What is claimed is:

1. A method of manufacturing an instrument panel which comprises a thermoplastic resin core material and a skin material integrally laminated to a surface of the resin core material, the instrument panel further comprising peripheral portions and a back portion, the instrument panel having brackets formed integrally with the resin core material in at least one of the peripheral portions and the back portion of the instrument panel; said brackets having at least one perforation, the method comprising the steps of:

placing the skin material into a mold cavity between a pair of male and female molds designed such that an instrument panel shape having said brackets can be formed; one of said molds having a protrusion, in a bracket formation portion thereof, having a size corresponding to the at least one perforation and the other of said molds having a corresponding concavity for receiving the protrusion, feeding a melt thermoplastic resin to the cavity defined by the skin material and the pair of male and female molds, and forming the instrument panel having said brackets by press-molding the melt thermoplastic resin, whereby the skin material is laminated on said surface of the resin core material and said at least one perforation is formed as a result of fitting the protrusion with the corresponding concavity.

2. A method according to claim 1 wherein said press-molding is carried out by moving the female mold initially toward the male mold then feeding the melt thermoplastic resin to the cavity and thereafter moving the female mold further toward the male mold to clamp said melt thermoplastic resin.

3. A method according to claim 1, wherein said press-molding is carried out by moving the female mold toward the male mold to clamp the melt thermoplastic resin as the melt thermoplastic resin is feeding into the cavity.

4. A method according to claim 1, further including providing vacuum suction to maintain the skin material on a mold surface of the female mold.

5. A method according to claim 1, further including cooling said instrument panel to form a cooled panel and removing the cooled panel.

6. A method according to claim 1, wherein the forming step is performed such that side walls of said protrusion and said concavity form a shear structure therebetween.

* * * * *